United States Patent [19]
Vanderlaan

[11] 4,009,642
[45] Mar. 1, 1977

[54] DIFFERENTIAL PRESSURE SENSING VALVE

[75] Inventor: Robert D. Vanderlaan, Kalamazoo, Mich.

[73] Assignee: Pneumo Corporation, Boston, Mass.

[22] Filed: Nov. 6, 1974

[21] Appl. No.: 521,262

[52] U.S. Cl. .............................. 91/464; 91/363 A; 91/447; 91/459; 137/106; 137/596.14

[51] Int. Cl.² ........................................ F15B 20/00

[58] Field of Search ............. 91/31, 32, 33, 363 A, 91/459, 464, 465, 446, 447; 137/106, 596.16

[56] References Cited

UNITED STATES PATENTS

| | | | |
|---|---|---|---|
| 2,964,059 | 12/1960 | Geyer | 137/625.62 |
| 3,429,225 | 2/1969 | Keyworth | 91/447 X |
| 3,438,306 | 4/1969 | Kazmarek | 91/363 A X |
| 3,540,350 | 11/1970 | Heine | 91/363 A X |
| 3,915,427 | 10/1975 | Swogger | 91/363 A X |
| 3,942,550 | 3/1976 | Orme | 137/596.12 X |

Primary Examiner—Alan Cohan
Assistant Examiner—Gerald A. Michalsky
Attorney, Agent, or Firm—Donnelly, Maky, Renner & Otto

[57] ABSTRACT

A differential pressure sensing valve has an axially shiftable spool including axially-spaced spool areas on which a pair of pressure sources connectable with such valve act in a predetermined direction with spool shifting force. Biasing means normally biases such spool with spool shifting force in a direction opposite to the predetermined direction. The opposite spool shifting forces are substantially balanced over the normal operating range of the pressure sources for maintaining such spool in an operating position for normal flow of fluid through the valve. Such opposite spool shifting forces are substantially unbalanced for shifting such spool out of such operating position when the pressure sources substantially deviate from their normal operating range.

14 Claims, 2 Drawing Figures

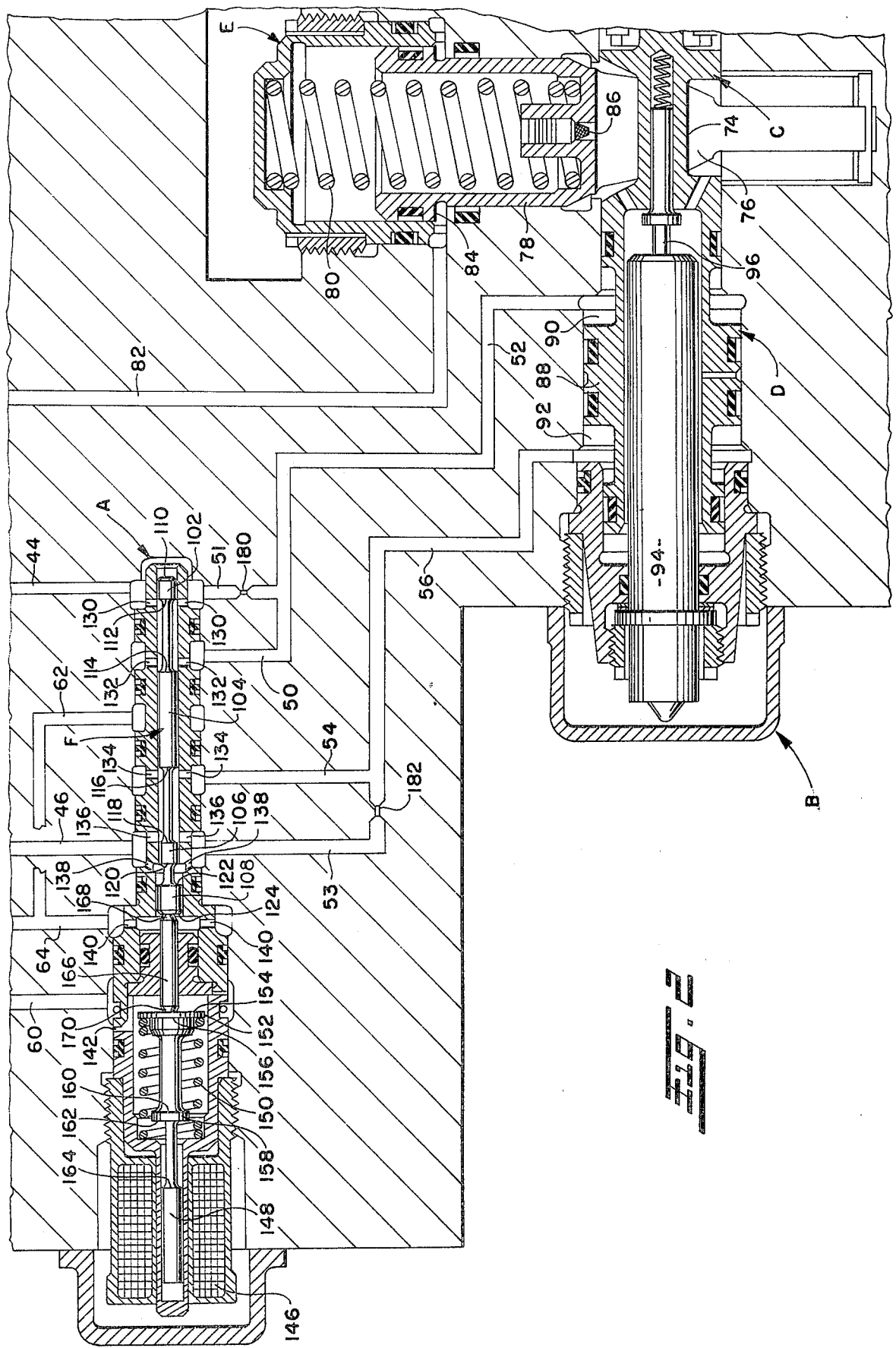

DIFFERENTIAL PRESSURE SENSING VALVE

BACKGROUND OF THE INVENTION

This application pertains to a differential pressure sensing valve, and more particularly to a control augmentation system having such valve incorporated therein.

Control augmentation systems are commonly provided for aircraft to operate under emergency conditions.

It is commonly desirable to recenter a servo when a failure occurs so that a controlled member will be returned to a passive position.

SUMMARY OF THE INVENTION

This application relates to a differential pressure sensing valve and to a control augmentation system having such valve incorporated therein. The differential pressure sensing valve in such system establishes control pressure level for such system, and senses system failures and signals shut down of the control augmentation system.

The differential pressure sensing valve of the present application provides actuator recentering rate control and limits actuator motion resulting from system failures.

In a preferred arrangement, the differential pressure sensing valve has an axially shiftable spool including axially-spaced spool areas on which a pair of pressure sources connectable with such valve act in a predetermined direction with spool shifting force. Biasing means normally biases such spool shifting force in a direction opposite to such predetermined direction. The opposite spool shifting forces are substantially balanced over the normal operating range of the pressure sources for maintaining the spool in an operating position for normal flow of fluid through the valve. Such opposite spool shifting forces are substantially unbalanced for shifting such spool out of such operating position when the pressure sources substantially deviate from their normal operating range.

In one arrangement, the biasing means for biasing the spool in a direction opposite to the predetermined direction includes a spring and another pressure source may be connected with such valve for acting on the spool in the same direction as the spring.

The differential pressure sensing valve includes inlet ports and outlet ports, and additional ports having flow control orifices. The inlet and outlet ports are in fluid flow communication when the spool is in its operating position and are blocked against fluid communication when the spool is axially shifted out of such operating position. The defined additional ports are in fluid flow communication with the inlet ports when the spool is shifted out of its operating position.

Fluid flows through the differential pressure sensing valve to an axially shiftable actuator for selectively shifting such actuator by differential pressures acting thereon over a normal operating pressure range. The differential pressure sensing valve senses deviations of the pressure sources outside of their normal operating range to block such pressure sources against communication with the actuator and to port such actuator to return. In the preferred arrangement, the actuator is ported to return through fluid flow control orifices.

It is a principal object of the present invention to provide an improved differential pressure sensing valve.

Another object of the invention is to provide an improved control augmentation system having an improved differential pressure sensing valve incorporated therein.

A further object of the invention is to provide a differential pressure sensing valve in a control augmentation system for providing actuator recentering rate control and to limit actuator motion resulting from system failure.

BRIEF DESCRIPTION OF THE DRAWING

The invention may take form in certain parts and arrangements of parts, a preferred embodiment of which will be described in detail in this specification and illustrated in the accompanying drawing which forms a part hereof.

FIG. 2 is an enlarged fragmentary view of a portion of FIG. 1 showing in more detail the improved differential pressure sensing valve of the present invention.

DESCRIPTION OF A PREFERRED EMBODIMENT

Figure 1:
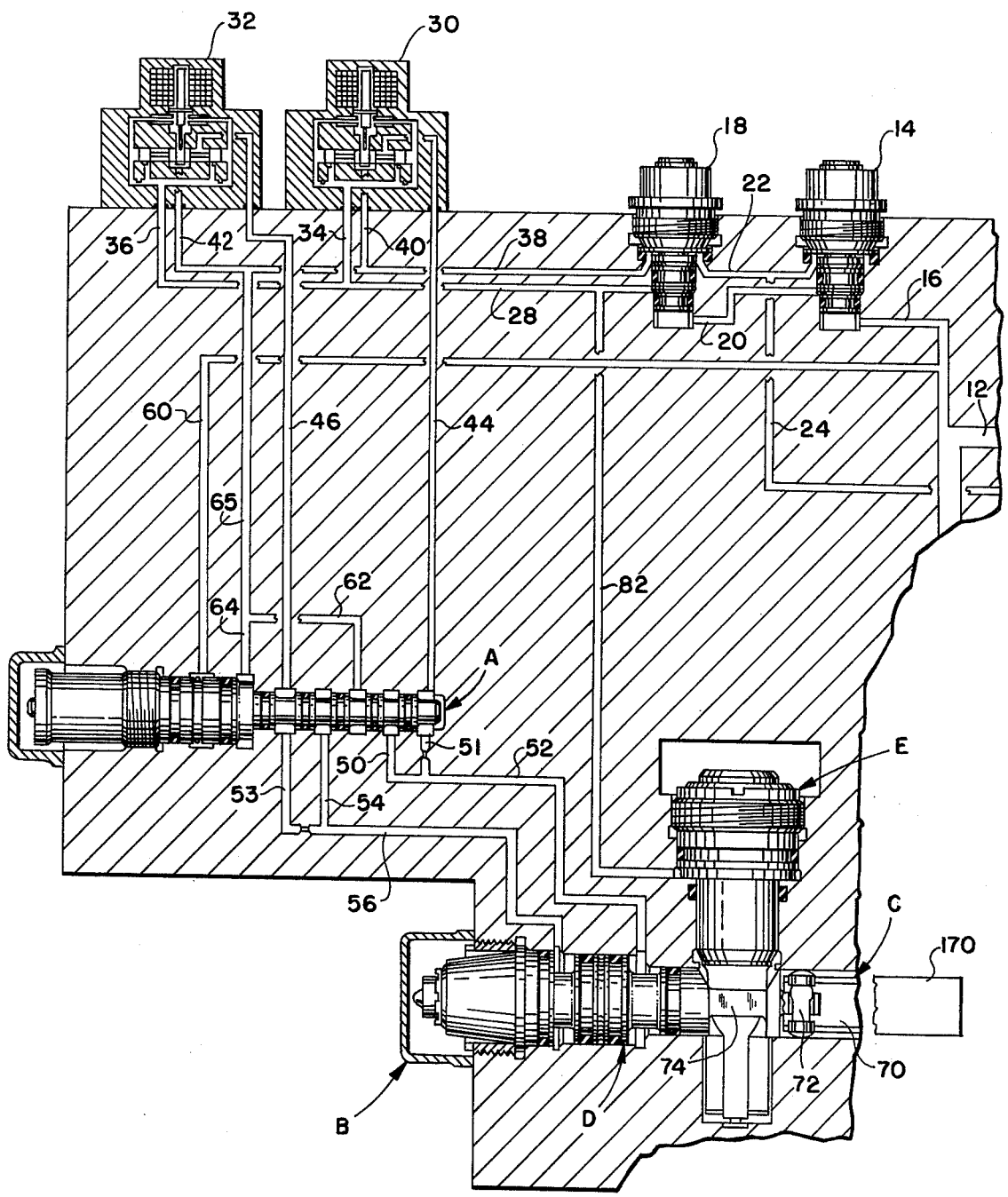
FIG. 1 shows a schematic hydraulic system having the improvements of the present invention incorporated therein.

Referring now to the drawing, wherein the showings are for purposes of illustrating a preferred embodiment of the invention only and not for purposes of limiting the same, FIG. 1 shows a hydraulic system having a source of high pressure hydraulic fluid 12 communicating with solenoid valve 14 through conduit 16. Another solenoid valve 18 is connected with solenoid valve 14 by pressure conduit 20 when such valves are open. Such valves are interconnected by conduit 22 leading to return conduit 24 when such valves are closed. High pressure conduit 28 leads from solenoid valve 18 to electro-hydraulic servo valves 30 and 32 through conduits 34 and 36. Return conduit 38 connected with solenoid valve 18 communicates with return conduit 22 in the closed position of such valve and is connected with return conduits 40 and 42 when servo valves 30 and 32 are shut down. High pressure outlet conduits 44 and 46 from servo valves 30 and 32 communicate with differential pressure sensing valve A having outlet conduits 50 and 51 communicating through conduit 52 with control augmentation system actuator B, and additional outlet conduits 53 and 54 connected with conduit 56 also communicating with actuator B.

Conduit 60 connected with high pressure source 12 also communicates with differential pressure sensing valve A. Return conduits 62 and 64 connected with differential pressure sensing valve A communicate with return conduit 38 through conduit 65.

Control pressures acting through conduits 44 and 46 from servo valves 30 and 32 are normally established at around 1575 p.s.i. and the normal working pressure level variation is around plus or minus 300 p.s.i. for shifting actuator B to selectively open a valve C through which fluid pressure is supplied to a piston for moving a controlled surface to a desired position.

Valve C includes a spool 70 connected by a suitable coupling 72 with piston D of actuator B. As clearly shown in FIG. 2, piston D has an extension including a rectangular portion 74 receiving a bifurcated projection 76 on piston 78 of lock E. Piston 78 is biased downwardly by coil spring 80 so that projection 76 locks piston D against axial movement away from its centered position. A high pressure conduit 82 connected with conduit 28 communicates with bottom periphery 84 of an enlarged diameter portion on piston 78 for moving such piston axially upwardly against the force of spring 80 so that projection 76 releases piston D for axial movement. A one-way check valve 86 centrally of piston 78 allows hydraulic fluid within the cavity surrounding small diameter portion 74 to flow to the rear of piston 78 when pressure in conduit 82 is relieved and spring 80 again biases piston 78 downwardly into a locking position.

Piston D includes a land 88 and conduit 52 communicates with a cavity as at 90 on one side of such land, while conduit 56 communicates with cavity 92 on the opposite side of such land. A linear variable differential transformer, commonly known as an LVDT, is shown at 94 and includes a movable operator 96 movable with piston D for sending feedback signals to the control system in a known manner.

Differential pressure sensing valve A includes an axially shiftable spool F having axially-spaced lands 102, 104, 106 and 108. Land 102 has opposite end areas 110 and 112. Land 104 has opposite end areas 114 and 116. Land 106 has opposite end areas 118 and 120. Land 108 has opposite end areas 122 and 124. The sleeve of differential pressure sensing valve A has ports at 130, 132, 134, 136, 138, 140 and 142. Valve A includes an LVDT 146 having an axially shiftable stem 148 to provide feedback signals to the control system, and servo valves 30 and 32. Stem 148 is normally biased to the right in FIG. 2 by coil spring 150 bearing against an enlarged end portion 152 having opposite end areas 154 and 156. Another enlarged portion 158 on stem 148 has opposite end areas 160 and 162, while another end area is shown at 164. Enlarged end portion 152 bears against axially shiftable pin 166 having opposite end areas 168 and 170. Areas 154, 156, 160, 162, and 164 on stem 148 are such that the high pressure acting on such areas through conduit 60 is substantially balanced so that such pressure is not tending to axially shift stem 148 in either direction. Such pressure acting on end area 170 on pin 166 is tending to shift pin 166 to the right so that pin 166 is biased to the right in FIG. 2 by the force of spring 150 and by supply pressure. Pressure from conduit 44 acting on areas 112 and 114 is balanced, while such pressure acting on end area 110 is tending to shift spool F to the left. Pressure from conduit 46 is balanced on areas 118 and 120, while such pressure acting on end area 122 is also tending to shift the spool F to the left. Return pressure from conduit 64 acts on area 124 minus area 168 tending to shift spool F to the right. Therefore, pressure from servo valves 30 and 32 acts through conduits 44 and 46 on areas 110 and 122 tending to shift spool F to the left. Such pressures tending to shift such spool to the left are balanced by the force of spring 150, supply pressure acting on area 170 and return pressure acting on area 124 minus area 168. Such opposed forces are normally balanced for maintaining spool F in its neutral position.

The normal working pressure level variations of the control pressure are about plus or minus 300 p.s.i. Differential pressure sensing valve A is designed so that such valve will shut off the normal flow path for hydraulic fluid if both control pressure levels exceed the normal pressure level variation and recentering of actuator B will occur automatically.

During normal operation of the system for axially shifting actuator B, servo valves 30 and 32 are adjusted so that an increase in pressure in one of conduits 44 or 46 causes a corresponding decrease in pressure in the other conduit. In the system described, pressures acting through conduits 52 and 56 on opposite sides of piston land 88 are balanced. If it is desired to shift piston D to the right, servo valve 32 is adjusted for increasing pressure in conduit 46, while servo valve 30 is adjusted for decreasing the pressure in conduit 44 by the same amount which the pressure in conduit 46 is increased. Such pressure acts through conduit 46, ports 134 and 136, conduits 53, 54 and 56 to cavity 92 on the left side of piston land 88. There is a reduction in pressure in conduit 44 acting through ports 130 and 132, conduits 50 and 51, and conduit 52 to cavity 90 on the right of piston land 88. Therefore, piston D of actuator B will shift to the right for shifting spool 70 of valve C to the right. Suitable adjustment of servo valves 30 and 32 can again balance the pressures in cavities 90 and 92 for maintaining piston D in any desired position. Opposite adjustment of servo valves 30 and 32 for increasing the pressure in conduit 44 and decreasing the pressure in conduit 46 will shift piston D to the left.

When the pressure in conduit 46 is increased, the pressure acting on area 122 is greater tending to shift spool F to the left. However, a reduction in pressure in conduit 44 results in a lower pressure acting on end area 110 so that the total force tending to move spool F to the left remains the same. Therefore, during normal operation of the system, the forces acting in opposite directions on spool F are normally always balanced.

Valve C includes a spring generally indicated at 150 in FIG. 1 for biasing spool 70 to a centered position. Examples of the operation of the system will be given for purposes of illustration. A failure of either servo valve 30 or 32 will result in the pressure in conduit 44 or 46 rapidly approaching supply pressure. LVDT 146 will command the other servo valve to increase its pressure accordingly for maintaining balanced pressure on spool F. Such rapidly increasing pressure also acts on the opposite areas of piston D in cavities 90 and 92 so that piston D will not move from the position it is in. When the pressures in both conduits 44 and 46 are around 1875 p.s.i., which is 300 p.s.i. greater than normal control pressure, spool F will shift to the left and LVDT 146 will command solenoid valve 14 and 18 to shut down. Servo valves 30 and 32 are spring biased to return when there is no supply pressure. Movement of spool F to the left causes lands 102 and 104 to close ports 130 and 134 so that pressure is no longer supplied to conduits 50 and 54. As soon as shut down of solenoids 14 and 18 occurs, the pressure in conduits 44 and 46 goes to return so that the force of spring 150 and supply pressure acting through conduit 60 quickly shuttles spool F to the extreme right. Land 104 closes ports 132 so that fluid cannot return through valve A from conduit 50. Land 106 closes ports 136 so that fluid cannot return to conduit 46 through valve A from conduit 54. Conduit 51 is open to return fluid through conduit 44 by way of ports 130, and conduit 53 is open to return of fluid to conduit 46 through ports 138. Conduits 51 and 53 have flow control orifices as at 180 and 182. Centering spring 170 of valve C will then shift piston D to its centered position at a controlled rate because hydraulic fluid bleeds through orifices 180 and 182 at a controlled rate. Shut down of solenoids 14 and 18 also ports conduit 82 to return so that lock E will be biased into its locked position by spring 80 when piston D reaches its centered position. If either of servo valves 30 or 32 fail so that it is ported to return, LVDT 146 will signal the other servo valves so that its pressure will approach zero. Spool F of valve A will quickly shuttle to the right under the force of spring 150 and supply pressure acting through conduit 60 so that fluid from cavities 90 and 92 can again flow from actuator B through conduits 52 and 56 only through rate controlled orifices 180 and 182.

Valve A senses differential pressure and commands system shut down when failures occur. Such differential pressure sensing valve A also controls recentering rate of piston D by allowing flow of fluid only through control orifices 180 and 182 when failures occur so that fluid is bled to or from cavities 90 and 92 only at a slow controlled rate.

In the system shown and described, the pair of pressure sources acting through conduits 44 and 46 act on axially-spaced areas of spool F in a predetermined direction with spool shifting force. The biasing means defined by spring 150, and supply pressure acting through conduit 60, biases such spool F in an opposite direction with spool shifting force. These forces are substantially balanced over the normal operating range of the pressure sources defined by servo valves 30 and 32 for normal flow of fluid through valve A. Such spool shifting forces are substantially unbalanced when the pressures in conduits 44 and 46 substantially deviate from their normal operating range so that spool F is shifted from its normal operating position to its position signaling system shut down and recentering of actuator B at a controlled rate through orifices 180 and 182. The inlet ports in valve A are normally in fluid flow communication from inlet conduits 44 and 46 to outlet conduits 50 and 54 when spool F is in its normal operating position. Outlet conduits 50 and 54 are blocked against fluid flow communication with inlet conduits 44 and 46 when spool F is shifted axially out of its normal operating position, while additional conduits 51 and 53 are in the fluid flow communication with conduits 44 and 46 when spool F shifts out of its operating position.

Although the invention has been shown and described with respect to a preferred embodiment, it is obvious that equivalent alterations and modifications will occur to others skilled in the art upon the reading and understanding of this specification. The present invention includes all such equivalent alterations and modifications, and is limited only by the scope of the claims.

I therefore, particularly point out and distinctly claim as my invention:

1. A differential pressure sensing valve having an axially shiftable spool including axially-spaced land areas on which a pair of pressure sources connectable with said valve act in a predetermined direction with spool shifting force, biasing means for biasing said spool in an opposite direction from said predetermined direction with spool shifting force, said forces being substantially balanced over the normal operating range of said pressure sources for maintaining said spool in an operating position for normal flow of fluid through said valve, said forces being substantially unbalanced for shifting said spool out of said operating position when said pressure sources substantially deviate from their normal operating range, said valve including inlet ports and outlet ports, and additional ports having flow control orifices, said inlet and outlet ports being in fluid flow communication when said spool is in said operating position and being blocked against fluid flow communication when said spool is axially shifted out of said operating position, and said additional ports being in fluid flow communication with said inlet ports when said spool is shifted out of said operating position.

2. A differential pressure sensing valve having an axially shiftable spool including axially-spaced land areas on which a pair of pressure sources connectable with said valve act in a predetermined direction with spool shifting force, biasing means for biasing said spool in an opposite direction from said predetermined direction with spool shifting force, said forces being substantially balanced over the normal operating range of said pressure sources for maintaining said spool in an operating position for normal flow of fluid through said valve, said forces being substantially unbalanced for shifting said spool out of said operating position when said pressure sources substantially deviate from their normal operating range, said valve including outlet ports communicating with oppositely facing actuator areas on an axially shiftable actuator for selectively shifting said actuator by differential pressures from said pressure sources acting on said actuator areas, said valve having inlet ports and including centering means for biasing said actuator to a centered position, said outlet ports including return ports having flow control orifices communicating with said actuator areas and with said inlet ports when said spool is shifted out of said operating position for re-centering of said actuator to said centered position from an out-of-center position at a controlled rate.

3. A differential pressure sensing valve having a pair of inlet and outlet ports and an axially shiftable spool including axially-spaced land areas on which a pair of pressure sources connectable with said valve through said pair of inlet ports act in the same predetermined direction with spool shifting force, biasing means for biasing said spool in an opposite direction from said pedetermined direction with spool shifting force, means for corresponding increasing the pressure at one of said inlet ports as the pressure at the other of said inlet ports is decreased and vice versa so that the total forces acting on said spool are substantially balanced over the normal operating range of said pressure sources for maintaining said spool in an operating position for normal flow of fluid through said valve between said inlet and outlet ports, and means for unbalancing said total forces acting on said spool for shifting said spool out of said operating position when said pressure sources substantially deviate from their normal operating range for blocking communication between said inlet and outlet ports.

4. The valve of claim 3 wherein said biasing means includes another pressure source connectable with said valve for applying a force to said spool biasing said spool in the opposite direction as aforesaid.

5. The valve of claim 4 wherein said biasing means further includes spring means.

6. The valve of claim 3 wherein said biasing means includes spring means.

7. The valve of claim 3 including additional ports having flow control orifices, said inlet and outlet ports being in fluid flow communication when said spool is in said operating position and being blocked against fluid flow communication when said spool is axially shifted out of said operating position as aforesaid, and said additional ports being in fluid flow communication with said inlet ports when said spool is shifted out of said operating position.

8. The valve of claim 3 wherein said biasing means includes an axially shiftable pin bearing against one end of said spool and a spring biasing said pin against said spool.

9. The valve of claim 8 and including another pressure source connectable with said valve for acting on said pin in the same direction as said spring.

10. The valve of claim 3 wherein said outlet ports communicate with oppositely facing actuator areas on an axially shiftable actuator for selectively shifting said actuator by differential pressures from said pressure sources acting on said actuator areas.

11. The valve of claim 10 further including centering means for biasing said actuator to a centered position, said outlet ports including return ports having flow control orifices communicating with said actuator areas and with said inlet ports when said spool is shifted out of said operating position for re-centering of said actuator to said centered position from an out-of-center position at a controlled rate.

12. In a fluid system including a pair of pressure sources connected for communication with oppositely facing actuator areas on an axially shiftable acutator for selectively shifting said actuator by differential pressures acting on said actuator areas over a normal operating pressure range of said pressure sources, a differential pressure sensing valve including means for providing separate flow paths between said pressure sources and said oppositely facing actuator areas over said normal operating range of said pressure sources, and means for sensing deviations of said pressure sources outside of said normal operating pressure range and shutting off said flow paths to block communication between said pressure sources and said actuator areas through said flow paths, and means for venting said actuator areas to return when said pressure sources are outside said normal operating pressure range, said valve including an axially shiftable spool having spool areas on which said pressure sources act in the same predetermined direction with spool shifting force, biasing means for biasing said spool with spool shifting force acting in opposition to said first mentioned force, said forces being substantially balanced over the normal operating range of said pressure sources for maintaining said spool in an operating position, means for correspondingly increasing the pressure acting on one of said spool areas as the pressure acting on another of said spool areas is decreased and vice versa so that the total forces acting on said spool are substantially balanced over the normal operating range of said pressure sources for maintaining said spool in an operating position for normal flow of fluid through said valve, and means for unbalancing said forces acting on said spool when said pressure sources deviate from said normal operating range for axially shifting said spool to block communication of said pressure sources with said actuator and vent said actuator areas to return.

13. The system of claim 12 wherein said biasing means includes a spring.

14. The system of claim 12 wherein said actuator areas are ported to return through flow control orifices which restrict the flow from said actuator areas to return.

* * * * *